United States Patent [19]

Quinn et al.

[11] 4,020,141
[45] Apr. 26, 1977

[54] METHOD OF MAKING HEAT-SEALABLE, HEAT-SHRINKABLE, BIAXIALLY ORIENTED POLYESTER FILM

[75] Inventors: James Maurice Quinn, Chillicothe, Ohio; Allen Gregg Kirk, Wilmington, Del.

[73] Assignee: E. I. Du Pont de Nemours and Company, Wilmington, Del.

[22] Filed: Mar. 5, 1975

[21] Appl. No.: 555,447

Related U.S. Application Data

[60] Division of Ser. No. 478,972, June 13, 1974, abandoned, which is a continuation-in-part of Ser. No. 397,311, Sept. 14, 1973, abandoned.

[52] U.S. Cl. .......................... 264/289; 264/210 R; 264/342 RE
[51] Int. Cl.² .................................. B29D 7/24
[58] Field of Search ........ 264/270 R, 289, 342 RE, 264/210; 260/75 T

[56] References Cited

UNITED STATES PATENTS

| | | | |
|---|---|---|---|
| 2,928,132 | 3/1960 | Richards, Jr. | 264/289 |
| 3,187,075 | 6/1965 | Seifried et al. | 260/75 T |
| 3,432,591 | 3/1969 | Heffelfinger | 264/289 |
| 3,554,976 | 1/1971 | Hull | 264/289 |
| 3,631,899 | 1/1972 | Erickson | 264/289 |
| 3,786,127 | 1/1974 | Peet et al. | 264/288 |

*Primary Examiner*—Donald J. Arnold

[57] ABSTRACT

A heat-sealable, heat-shrinkable, biaxially oriented polyester film is provided which is usable in making shrink packages having improved seals and improved optics by reason of having:
 a relative viscosity (at 1% concentration in 60/40 tetrachloroethane/phenol at 30° C.) of at least 1.80;
 substantially balanced latent shrinkage of from about 31% to 47% at 100° C.;
 an average shrinkage force of less than about 1,000 psi at 100° C.;
 a melting point of from about 215° C. to 230° C.;
 haze of less than 5%; and
 such film being essentially polyethylene terephthalate.

A method of making this film also is provided including the steps of:
 forming a polymer consisting primarily of poly(ethylene terephthalate) with additional monomeric units selected from a second glycol and/or a second acid;
 casting a molten web of the polymer onto a cooled quenching surface to cool it below its glass transition temperature and thereby form a substantially amorphous, self-supporting film;
 stripping the film from the quenching surface;
 heating the film to a temperature from about 60° to 80° C. by passage between and contact with slow nip rolls of a nip-roll stretcher;
 further heating the film to a temperature from about 65° to 85° C. by radiant heating means after emergence from the slow nip rolls, but before engagement with fast nip rolls of the nip-roll stretcher;
 stretching the film in the machine direction by a stretch ratio from about 2.5 to 3.6 by maintaining the peripheral velocity of the fast nip rolls greater than the slow nip rolls by a factor equivalent to the stretch ratio, the stretching span being substantially less than the distance between the slow and fast nip rolls;
 preheating the film from about 50° to 80° C. prior to entering a tenter frame for cross-machine direction stretching;
 stretching the film in the tenter frame while heating such film at from about 50° to 85° C. so that the portion of the film subjected to stretching is stretched in the cross-machine direction by a factor of from about 2.9 to 4.0; and
 further heating the stretched film in the tenter frame to a temperature from about 65° to 100° C. while permitting the film to relax in width by a factor from about 0 to 5.0% its stretched width.

2 Claims, 4 Drawing Figures

METHOD OF MAKING HEAT-SEALABLE, HEAT-SHRINKABLE, BIAXIALLY ORIENTED POLYESTER FILM

This is a division of application Ser. No. 478,972, filed June 13, 1974, which application is a continuation-in-part of application Ser. No. 397,311, filed Sept. 14, 1973, and both now abandoned.

BACKGROUND OF THE INVENTION

1. Field of the Invention

This invention is a heat-shrinkable, heat-sealable, biaxially oriented polyester film and method of making such film.

In particular, such invention is a novel essentially polyethylene terephthalate film usable in making shrink packages having improved seals and improved optics.

These improved features are primarily the result of the film having:
a relative viscosity of at least 1.80;
substantially balanced latent shrinkage;
a low shrinkage force;
a melting point of from about 215° C. to 230° C.; and haze of less than 5%.

2. Description of the Prior Art

U.S. Pat. No. 2,928,132 to Richards is exemplary of the prior art. Such patent discloses a method of producing a shrinkable polyethylene terephthalate film having substantially the same degree of shrinkage in both directions of the film.

Canadian patent 694,367, another example of the prior art, shows a process for the manufacture of shrinkable seamless tubular foils of polyethylene terephthalate, which films shrink on heating to above 90° C. by more than 30% in each superficial direction.

While these patents show the making of heat-shrinkable polyester films they do not show the making of the improved film of this invention with its critical properties, as made by the novel method also of this invention, whereby such film is capable of being used in making shrink packages having improved seals and improved optics.

SUMMARY OF THE INVENTION

This invention is a novel heat-shrinkable, heat-sealable biaxially oriented polyester film.

Such film is particularly useful in making shrink packages having improved seals that survive the shrinking step and which, after shrinking occurs, have improved optics.

A typical method of making such packages includes the steps of:
wrapping the film about an article to be packaged;
bringing surface portions of the film into abutting contact with each other;
heat sealing such abutting portions together; and
shrinking the film into skin-like contact with the article (or parts of it) to form the skin package.

The film of the instant invention is capable of being overwrapped about an article and heat sealed to itself using this package-making (or a similar) method and further is capable of being shrunk into skin-like contact with the article to form a shrink package at shrink tunnel temperatures within the range from about 250° F. (104° C.) to 475° F. (246° C.), while maintaining seal integrity.

Basically such film is a biaxially oriented polyester (essentially polyethylene terephthalate) shrink film, having:
a relative viscosity (at 1% concentration in 60/40 tetrachloroethane/phenol at 30° C.) of at least 1.80;
substantially balanced latent shrinkage within the range from about 31% to 47% at 100° C.;
an average shrinkage force of less than about 1,000 psi at 100° C.;
a melting point of from about 215° C. to 230° C.; and haze of less than 5%.

These critical, interrelated properties enable the film to function in an improved fashion in making shrink packages of a type, and having properties, not before available to the art.

The clarity of the film is particularly noteworthy and adds merchandisability to almost any product. It maintains its sparkle; it does not cloud with age.

The polyester shrink film of this invention has a high percentage of usable shrinkage (up to about 40%) in addition to its clarity, gloss, and sparkle. The film has toughness, durability and strength and it holds up against rough handling. It resists tear propagation. It remains flexible at temperatures as low as −80° F. and retains its strength at 300° F. and higher. It offers a good barrier against moisture.

The film also offers good machinability. It seals easily and effectively. Such film shrinks rapidly and hugs tightly within a tunnel temperature range of 250° to 475° F. (This wide range lessens problems created by fluctuation in heat or burn-through during occasional line jams.)

During shrinking, any excess film, caused by irregular shapes, pulls out evenly and "dog-ears" pull in neatly. The film conforms to uneven surfaces and projections and even pulls down over sharp, pointed objects.

Such film can be used on virtually any size or shape products but is particularly suited for products subject to burn-through in processing or having unusual shapes.

Shrink packages formed using this film are improved packages. In addition to package protection, the film assures improved package esthetics as well as easy and effective sealing.

In summary, the film of this invention is usable in making improved shrink packages having many desired properties, including improved optics (i.e., desired clarity, haze, gloss, etc.) and improved seals. The critical properties of this novel film, and the novel method of making it, which bring about these improvements, are the touchstones of this invention.

DESCRIPTION OF THE PREFERRED EMBODIMENT

Figure 1:
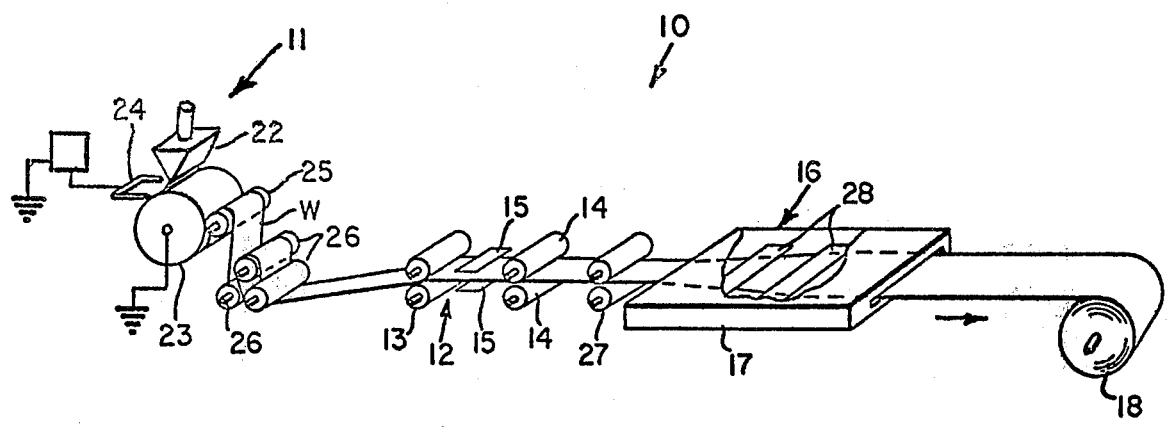
FIG. 1 is a diagramatic view of an apparatus for making a biaxially oriented film of this invention. Such apparatus includes an extrusion die for casting a molten web of polymeric material onto a quenching roll to form a film; means for stripping the film so formed from the quenching roll; means for stretching the film in a machine direction (in the form of a nip-roll stretcher including slow nip rolls and fast nip rolls with radiant heaters positioned therebetween); and, means for stretching the film in a cross-machine direction (in the form of a tenter frame) to form the heat-sealable, heat-shrinkable, biaxially oriented polyester film of this invention.

This invention is a polyester shrink film and further is a method of making such film.

Generally described, a method of making a heat-sealable, heat-shrinkable, biaxially oriented polyester film of this invention includes the steps of:
  forming a polymer consisting primarily of poly(ethylene terephthalate) with additional monomeric units selected from a second glycol and/or a second acid;
  casting a molten web of the polymer onto a cooled quenching surface to cool it below its glass transistion temperature and thereby form a film;
  stripping the film from the quenching surface;
  first stretching the film in the machine direction in a nip-roll stretcher by a stretch ratio from about 2.5 to 3.6; and
  second stretching the film in the cross-machine direction in a tenter frame by a factor of from about 2.9 to 4.0.

The film of this invention is a modified improved polyethylene terephthalate type film.

Polyethylene terephthalate film is formed by the condensation reaction of ethylene glycol and terephthalic acid. Particulars of this material are shown and described in U.S. Pat. No. 2,465,319 to Whinfield and Dickson. More specifically, polyethylene terephthalate useful in this invention contains primarily repeating ethylene terephthalate monomeric units of the formula:

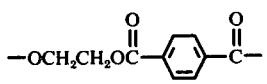

with other monomeric units selected from other ester-forming components, such as of ethylene terephthalate wherein up to about 25 mole percent of the copolymer is prepared from the monomer units of diethylene glycol, propane-1,3-diol; butane-1,4-diol; polytetramethylene glycol; polyethylene glycol; polypropylene glycol and the like, substituted for the glycol moiety in the preparation of the copolymer and/or azelaic; isophthalic, bibenzoic, naphthalene 1,4- or 2,6-dicarboxylic, adipic, sebacic, decane-1,10-dicarboxylic acid, and the like, substituted for part of the acid moiety in the preparation of the copolymer.

Polyethylene terephthalate film is used extensively for wrapping and packaging. In such uses, it is often desirable for the film to be heat-shrinkable so as to facilitate the preparation of tautly wrapped or skintight packages, and, in addition, be heat-sealable so as to be usable on automated packaging equipment. It is difficult to provide a film that satisfies both of these criteria, i.e. film with adequate shrinkage in which the shrinkage force does not exceed the seal strength. Previous attempts to do so have often resulted in film with other drawbacks such as poor optical properties or a narrow heat-shrinking temperature range which requires elaborate and expensive equipment for its use.

This invention relates to an essentially polyethylene terephthalate film which exhibits improved heat-shrinking and heat-sealing characteristics. Specifically, such invention provides a method of making a biaxially oriented polyester film formed of a polymer comprising essentially polyethylene terephthalate and minor parts of diethylene glycol and azelaic acid.

The heat-sealable, heat-shrinkable, biaxially oriented polyester film of this invention is usable in making shrink packages having improved seals and improved optics by reason of having:
  a relative viscosity (in 60/40 tetrachloroethane/phenol at 30° C.) of at least 1.80;
  substantially balanced latent shrinkage of from about 31% to 47% at 100° C.;
  an average shrinkage force of less than about 1,000 psi at 100° C.;
  a melting point of from about 215° C. to 230° C.;
  haze of less than about 5%; and
  such film being essentially polyethylene terephthalate.

These are all critical properties and, in combination, work together in providing the art a novel film for making improved shrink packages.

One of the novel, and critical, properties of the film of this invention is its ability to be heat-sealed to itself using available heat-sealing equipment. The seal thus formed is unusually strong and peculiarly adapted to survive the various forces acting upon it as the film is shrunk about an article in a shrink tunnel, for example.

By forming the film from a polymer having a relative viscosity of at least 1.80, average seal strengths of at least 1,000 grams per inch are possible and such seal strengths are rarely less than 2,000 grams per inch. With seal strengths of this magnitude it is possible to shrink the film into contact with the article in the shrink tunnel without disrupting such seal.

This ability of the seal to maintain its integrity during the shrinking operation further depends on two other factors available in the film: (1) its substantially balanced latent shrinkage (this means that the difference in shrinkage is no more than 5-10% between the machine or cross-machine directions) and (2) its low shrinkage force, further to be described.

During the shrinking of the film about the article in the shrink tunnel, extraordinary, and often uneven forces are imposed on the seal which tend to destroy its effectiveness. By providing substantially balanced latent shrinkage (in the range from about 31% to 47% at 100° C.) and by providing a low shrinkage force (of less than from about 1,000 psi at 100° C.), the seal (of at least 1,000 grams/inch strength) will hold up during this critical, most troublesome, shrink package making step.

Requisite viscosity levels can be obtained by methods known in the art, such as U.S. Pat. No. 3,432,591 to Heffelfinger which discloses a process for making biaxially oriented, heat-set film of high viscosity polyethylene terephthalate. The control of the degree of shrinkage as a function of stretching conditions and heat setting is disclosed in U.S. Pat. No. 3,187,075 to Seifried and means for achieving the balanced latent shrinkage is disclosed in U.S. Pat. No. 2,928,132 to Richards. And, as is known shrinkage force is primarily a function of stretch ratio, the temperature of stretch and relaxation.

The melting point of the film is another of its key properties. It must be over 215° C. to prevent tackiness and minimize burn-through and below 230° C. to provide a desired even shrinkage to prevent distortion (and, hence, maintain package optics) during shrinkage.

Modification of the substantially pure polyethylene terephthalate polymer to alter the melting point is taught in U.S. Pat. No. 3,554,976 to Hull, which patent is hereby incorporated by reference. Such patent discloses that diethylene glycol or azelaic acid can be used to form a copolymer with a lower melting point than substantially pure polyethylene terephthalate.

In making the film of this invention, the first step, accordingly, is to form a desired polymer (of a type taught by U.S. Pat. No. 3,554,976 to Hull, for example, and of the desired viscosity and melting point) after which film formed from the polymer is stretched biaxially under controlled conditions.

In a process of making an exemplary film of this invention, bis-dihydroxyethyl terephthalate and dihydroxyethyl azelate are copolymerized by conventional condensation polymerization techniques as illustrated, for example, in U.S. Pat. No. 2,465,319 to Whinfield and Dickson, which patent also is hereby incorporated by reference. The polymerization is generally carried out at elevated temperatures, for example, about from 220° to 300° C. to increase the speed of the reaction. The reaction is also usually carried out in the presence of an appropriate catalyst under reduced pressure to facilitate the removal of the ethylene glycol formed in the condensation.

Figure 2:
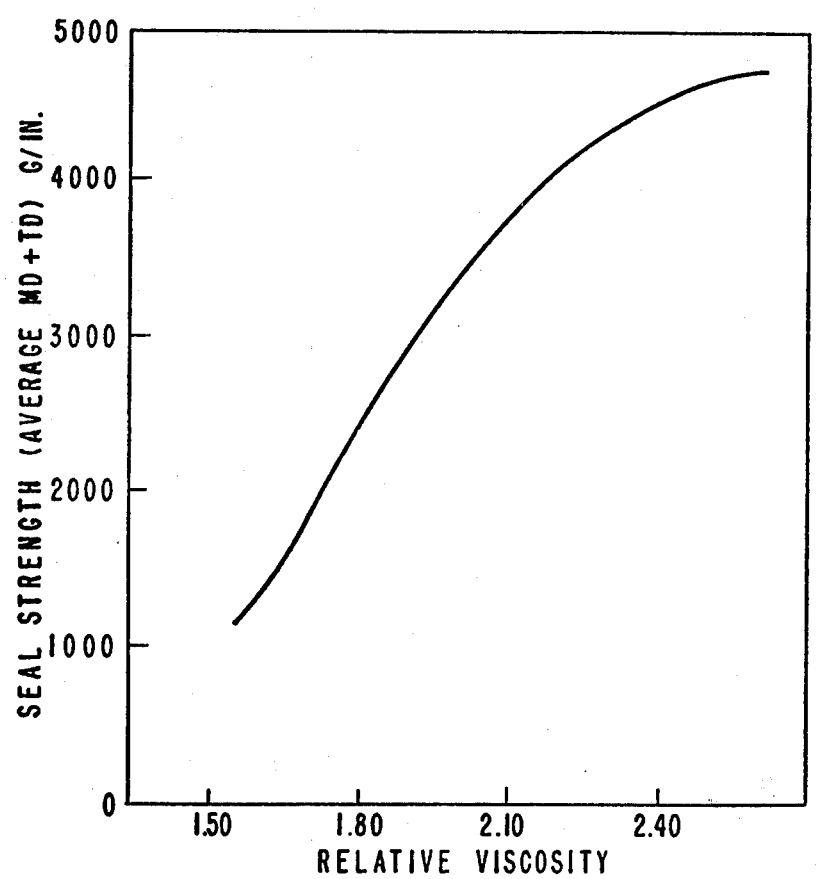
FIGS. 2, 3 and 4 are graphs showing improvements in heat-seal strength brought out using higher viscosity polymer films. Specifically such graphs show that as the relative viscosity of the polymer increases above 1.80 not only is the strength of the heat-seals improved but so is their reliability, as expressed by the number of improved seals, as is their stress-flex resistance or durability.
Figure 4:
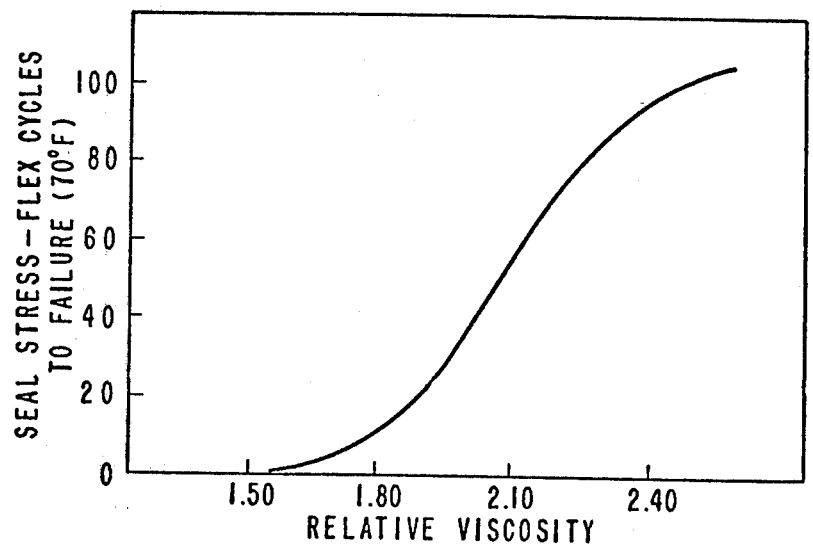

If the melting point of the product is a criterion of the utility of the film, as it is in this invention, then the weight percent of dihydroxyethyl azelate copolymer to be added can be determined from FIGS. 2 and 4 of the Hull patent, which show the depression of the melting temperature respectively as a function of the mole percent and weight percent of dihydroxyethyl azelate added. In practice, the additives are introduced by weight, based on polymer throughput.

The completed copolyester can then be cast into a film by conventional, and carefully controlled, techniques.

With respect to the specific requirements of the film of this invention, it has been found that the ability to form a heat seal of effective strength (for the degree of shrinkage force required) with a hot wire sealer, such as a Weldatron L-Sealer, the viscosity level of the polymer in the film is critical. At a relative viscosity (at 1% concentration in 60/40 TCE/phenol) below 1.80, seal strengths are below the minimum average of 1,000 g/inch which is required for reliability in packages for film having 31 to 47% shrinkage and a shrinking force of 825 to 1,000 psi. At a viscosity of 1.80 and above bond strength reliability is good.

Further, as shown in the drawings, the strength of the heat seals generally increases with increasing relative viscosity of the polymer in the film and, while seals of lower viscosity film may exhibit occasionally high strength, and, conversely, some seals of high viscosity film may be unexpectedly weak, statistically, the higher the viscosity, the greater the fraction of satisfactory seals (>2000 g./in.) Viscosity further is a determinant in another example indicative of package utility (i.e., seal durability) which is related to how well a heat-sealed, shrink-wrapped package withstands handling in use. As the drawings indicate, the heat seals of the higher viscosity films show increasing resistance to failure, as viscosity increases above 1.80, when subjected to a stress-flex test.

Another common deficiency of shrink films is the tendency during shrinkage to form patterns of optical distortion, which appear as thick ridges with highly birefringent, sharply defined boundaries, on the packages. This defect is believed to be caused by shrinkage forces acting unevenly on the partially restrained film. Attempts to eliminate this defect by adjusting the variables of thickness, stretch ratio, stretch temperature, slip, and heat-setting eliminated this defect only when the extent of shrinkage fell to unacceptable levels. Unexpectedly, however, films having lower polymer melting points do not exhibit this fault. The effect is absent in film with polymer melting points below 230° C., but melting points must be above 215° C. to provide films which do not become tacky or gummy in processing.

In making the shrink package it is subjected to heating in a shrink-tunnel, generally supplied with forced hot air. Variations in equipment and processing speeds can result in variations in the temperature to which the film is subjected. If the temperature is below the minimum temperature at which the film fully shrinks, the package may remain loose, and wrinkles may persist. On the other hand, if the temperature to which the film is exposed is too high, the heat seals may fail and the film may rupture or form small holes.

Accordingly, it is desirable to have a film with as wide a practical shrink temperature range (PSTR) as possible so as not to be outside the upper and lower operative limits. It has been found that a lower temperature of below 200°–225° F. is inadequate to effect sufficient shrinkage, and an upper temperature of 325° to 350° F. causes distortion, frequent seal failures and formation of pinholes.

It further has been found that the PSTR can be controlled by the percentage shrinkage. Such PSTR is sufficiently broad to permit reliable control at as low as 31% shrinkage, but shrinkage levels above about 47%, while having an adequate PSTR, tend to excessively distort the package, and/or rupture the seal; hence, 47% has been found to be a practical upper limit.

The overall quality of the package depends upon retention of heat seals during shrinkage. The frequency of seal failures is a function of the shrinkage force. It has been found that failures are common at shrinkage forces of 1,300 psi, but at 825–1,000 psi failures related to excessive shrinking forces are rare.

Finally, for uniform wrinkle removal, the extent of shrinkage should be balanced. This is particularly true in removal of radial wrinkles with their origin at corners of angular objects positioned on a board and wrapped.

As to optics, a maximum haze value of about 5, a minimum clarity value of about 72 and minimum gloss values at 20° and 30° of about 150 and 115 are desired in the finished film.

The result of carefully controlling these key interrelated properties of the film is a novel, useful shrink-film for making shrink packages having improved optics and seals.

Generally, the polymer used in making the film of this invention may be prepared in the desired proportions by any conventional technique which can produce a homogeneous composition. The resulting polymer can be extruded, preferably from a melt, in a flat or tubular film by usual methods known to those skilled in the art. To obtain the desired heat-shrinking characteristics, the film is then stretch-oriented, in each of two mutually perpendicular directions. The orientation temperature of these films will vary according to the particular polymer used in making the film. After stretching, heat setting and relaxation, the film is cooled under tension, while maintaining the sheet substantially at its expanded dimensions. Apparatus which can be used in the orientation is of a type generallyzused in the art, such as that described in detail in Goldman and Wallenfels U.S. Pat. No. 3,141,912, which is hereby incorporated by reference.

Another apparatus which may be used (with minor modifications) for stretching the film is shown in U.S. Pat. No. 2,823,421 to Scarlett. As seen there, such film is continuously stretched longitudinally and then transversely in a device essentially composed of two main parts, namely, a longitudinal or machine-direction stretching section and a transverse or cross-machine stretching section. The longitudinal stretching is composed of horizontal rolls in parallel arrangement in line in different vertical and horizontal planes. The first rolls are positively driven "slow rolls" and later rolls are closely spaced idler rolls not positively driven and still later rolls are positively driven "fast rolls." Actual stretching is carried out over the span including the idler rolls.

The transverse section of the stretching device is essentially divided into four zones, and the entire section is composed of a tenter frame having a chain of tenter clips on each side of the film. As the film emerges from the longitudinal stretching section, it is directed between parallel rows of tenter clips and these tenter clips grasp the edges of the longitudinally stretched material and move outwardly to stretch the film transversely. The film is lightly heat-set and slightly relaxed after stretching. The thickened edges of the film formed during the manufacturing operation inherently provide an excellent gripping means for the tenter clips. These thickened edges or beads later are cut from the material and sent to a recovery area.

This invention further is a method of improving the physical properties of polyester film, e.g. polyethylene terephthalate type film, by stretching it, under critical conditions, to orient it. Such stretched film is useful in a great variety of applications, i.e., packaging, electrical applications, protective coverings, and many other uses.

Referring to the drawing, there is shown an apparatus 10 for practicing the method of this invention for orienting by stretching (making) a web W of film, such as the improved polyethylene terephthalate film of this invention, to provide film having desired physical properties.

Referring to FIG. 1 of the drawing, it will be seen that the web W of material to be oriented by apparatus 10 is supplied from a supply source 11 and moved into operative association with a first stretching means 12 including a first and second set of nip rolls 13 and 14 and a non-contacting heating means 15 and, thereafter, into operative association with a second stretching means 16, in the form of a tenter oven 17, and, hence, onto a windup roll 18.

The supply source 11 may be any appropriate source, such as a supply roll or a web or amorphous film as it emerges from a polyethylene terephthalate production line, for example. As applied to polyethylene terephthalate film, the polymer is melt-extruded from a slit orifice in a hopper 22 and is cast onto an internally cooled rotating quench drum 23 held at a temperature of about 30° C. to produce a substantially amorphous self-supporting film in web form W. To aid in the quenching step, if desired, electrostatic pinning means, as shown at 24, may be employed.

Web W is then stripped from the drum 23, passed over a stripper roll 25 and around tension-isolation rolls 26 and is then passed to the first-stage stretching zone or means 12, where it is first stretched in the machine direction to uniaxially orient it. From the first stretching means 12, the web W is passed between tenter oven preheater rolls 27 and thence, to the second-stage stretching means of zone 16 where it is further heated, by the tenter oven heaters 28, and second stretched in the cross-machine direction to biaxially orient the film. For control of shrinkage properties, the web W is lightly heat-set and slightly relaxed before being wound onto the windup roll 18.

The first set of nip rolls 13 (so-called slow rolls) consists of an upper nip roll and a lower nip roll which is driven at a first speed by appropriate means (not shown), and the second set of nip rolls 14 (so-called fast rolls) consists of an upper nip roll and a lower nip roll which is driven at a second speed faster than the first speed whereby to apply stretching forces to the web W. The slow rolls 13 are heated.

As the web W moves past the heating means 15, in the form of indirect or noncontacting heating means parts, such as electric radiant heaters, positioned above and below the web W and spaced from it, the web is heated to an orienting temperatere slightly above its glass transition temperature. By heating web W, it is rendered more ductile and deformable or stretchable and substantially all of the stretching occurs after heating; that is, in the short span between the heating means 15 and the fast set of nip rolls 14. In this shortened span, the web W may be stretched effectively to orient it. The stretching of the web W is brought about by the speed difference between the slow and fast sets of nip rolls 13 and 14 and the extent of longitudinal stretching is determined by this difference in linear speed of such rolls, in a manner known to the art.

The web W is heated to a temperature from about 60° C. to 80° C. by contact with the slow rolls 13 and is further heated by the indirect heating means 15 to a stretching temperature from about between 65° to 85° C. The stretching occurs primarily in the shortened span between the indirect heating means 15 and the fast rolls 14.

The film is first stretched in the machine direction by the first stretching means at a stretch ratio of from 2.5 to 3.6%.

Acceptable stretching apparatus for accomplishing this stretching step may be found in U.S. patent application Ser. No. 110,683 (F-2032-A-R) to Peet et al. now U.S. Pat. No. 3,786,127

After the first stretching means has stretched the film to uniaxially orient it under these critical conditions, the film is preheated by tenter frame preheat rolls 27 to a temperature from between about 50° to 80° C. prior to being passed into the tenter frame 17. In the tenter frame 17 the film is heated to a temperature from about 50° to 85° C. and simultaneously subjected to transverse or cross-machine stretching by a factor of 2.9 to 4.0 to biaxially orient the film.

Preferably, the biaxially oriented film is then heated again in the tenter frame to a temperature from between 65° to 100° C. while permitting the film to relax by a factor of from 0 to 5.0% of its stretched width.

A method of this invention of making a heat-sealable, heat-shrinkable, biaxially oriented polyester film also of this invention, accordingly, includes the steps of:
forming a polymer consisting primarily of poly(ethylene terephthalate) with additional monomeric units selected from a second glycol and/or a second acid;
casting a molten web of the polymer onto a cooled quenching surface to cool it below its glass transition temperature and thereby form a film;
stripping the film from the quenching surface;
heating the film to a temperature from about 60° C. to 80° C. by passage between and contact with slow nip rolls of a nip-roll stretcher;
further heating the film to a temperature from 65° to 85° C. by radiant heat after emergence from the slow nip rolls, but before engagement with fast nip rolls of the nip-roll stretcher;
stretching the film by a stretch ratio from 2.5 to 3.6 by maintaining the peripheral velocity of the fast nip rolls greater than the slow nip rolls by a factor equivalent to the stretch ratio, the stretching span being substantially less than the distance between the slow and fast nip rolls;
preheating the film from 50° to 80° C. prior to entering a tenter frame for transverse stretching;
stretching the film transversely in the tenter frame while heating such film at from about 50° to 85° C. so that the portion of the film subjected to transverse stretching is transversely stretched by a factor of from 2.9 to 4.0; and
subjecting the biaxially stretched film to a further heat treatment in the tenter frame by heating it to a temperature from 65° to 100° C. while permitting the film to relax in width by a factor of 0 to 5.0% its stretched width.

EXAMPLE

Polyethylene terephthalate, in which 12.4% of the ethylene glycol component was replaced with diethylene glycol, and the terephthalic acid component was replaced by 1.16% azelaic acid (weight based on dihydroxyethyl azelate), containing about 1,200 ppm of calcium phosphate slip additive with a size range from less than 1 to 2.5 microns and 500 ppm of a polyethylene glycol phosphonate added during polymerization was cast from a slot die and electrostatically pinned at the film edges, according to the method of U.S. Pat. No. 3,223,757 to Owens et al., to a quenching drum cooled to 19° C. by circulation of fluids in the interior of the drum. The poly(ethylene terephthalate) modified with a minor fraction of the ethylene glycol component substituted with diethylene glycol and azelaic acid had a crystal melting point of 229° C.

After contact with the drum surface at a velocity of 123 ft/min., for an angle of about 270° and reaching a temperature below the glass transition of the polymer, the substantially amorphous film formed thereby was stripped from the quenching drum. The film was immediately supplied to the nip rolls of a machine-direction nip-roll stretcher with spaced-apart slow and fast nip rolls. The film was heated by the slow nip rolls to 72° C.; then in the free span between the slow and fast nip rolls it is further heated to a temperature of 74° C. by radiant heaters and stretched over a span of 2 inches to 3.4 times its original length at a rate of about 500,000% per minute.

This stretched film was then fed over preheat rolls maintained at 72° C. and into a tenter frame where it was stretched in a cross-machine direction 3.4 times at a temperature of 74° C. and at a rate of 4,300% per minute. At the completion of this stretching, the film was immediately heat-set in an extension of the tenter frame at about 81°–82° C. while under 2% relaxation.

The properties of the heat-sealable, heat-shrinkable, biaxially oriented film formed according to the above description are summarized in the following table:

Table

| | |
|---|---|
| Nominal thickness | 0.5 mil |
| Tensile Strength, MD | 34,500 psi |
| Tensile Strength, TD | 35,200 psi |
| Elongation at break, MD | 107% |
| Elongation at break, TD | 124% |
| Modulus, MD | 417,000 psi |
| Modulus, TD | 443,000 psi |
| Clarity | 80.4% |
| Haze | 2.8% |
| 20° Gloss | 182 |
| Slip Angle | 35° |
| Relative Viscosity | 1.85 |
| Melting Point | 229° C. |
| Tg | 68° C. |
| Shrinkage % | |
| (100° C. in water), MD | 36.5 |
| (100° C. in water), TD | 39.0 |
| Shrinkage Force MD | 947 psi |
| TD | 849 psi |
| PSTR (° F.) | 100 |
| Seal Strength | |
| (average) MD | 2510 g/in. |
| TD | 2335 g/in. |

| Property | Typical Film Properties | | Gauge 50 |
|---|---|---|---|
| | Test | Units | |
| Yield | ASTM D374 | sq.in./lb. | 40,000 |
| Gauge | ASTM D1003 | inches | .00050 |
| Haze | ASTM D1003 | % | 3.0 |
| Gloss at 20° | ASTM D2457 | (photocell) | 150 |
| Gloss at 30° | | | 141 |
| Shrinkage (average) | 250° F. (film temperature) | % | 40 |
| Shrinkage Force | at 100° C. | psi | 900 |
| Seal Strength | hot wire seal | g/in. | 2,000 |
| Tensile Strength | ASTM D882 | psi | 30,000 |
| Stiffness Modulus | ASTM D882 | psi | 500,000 |
| Elongation | ASTM D882 | % | 100 |
| Tear Strength | Elmendorf | gm | 15 |
| MVTR | ASTM E96 Procedure E | gm/100 sq. in./24 hrs. | 2.1 |
| Oxygen Permeability | ASTM D1434 | cc/100 sq. in./ | |

-continued

| Property | Typical Film Properties | | Gauge 50 |
|---|---|---|---|
| | Test | Units | |
| Coefficient of Friction (Film to Film) | ASTM D1894 | 24 hrs./atm | 9 .4 |
| Clarity | ASTM-1746-67T | | 79.0 |

As stated, the drawings show the dramatic improvements in seal strength brought about by increases in viscosity above 1.80.

FIG. 2, for example, shows that increases in relative viscosity above 1.80 brings about unexpected and desired increases in seal strength (average MD and TD) in grams per inch.

Figure 3:
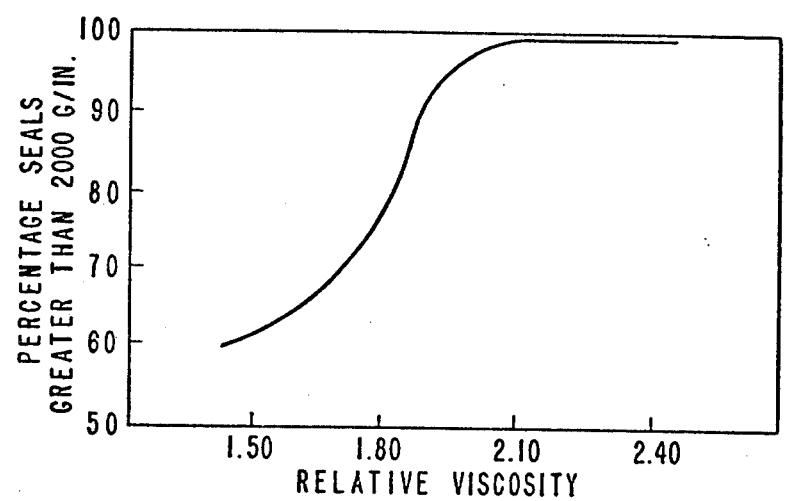

FIG. 3 speaks to the same point and shows that the percentage of seals with seal strengths greater than 2000 grams per inch increases with increases of relative viscosity above 1.80.

Lastly, FIG. 4 shows that increases in relative viscosity above 1.80 produces seals having greater resistance to stress-flex (tested as described in the article entitled, "A New Stress-Flex Tester," in Modern Packaging, March 1961 issue, starting at page 123).

From these showings, it is seen that in order to reliably obtain strong heat seals with high durability upon flexing, the shrink film must have a relative viscosity of at least 1.80.

From these tables and from the foregoing description, it will be seen that there is provided, by using a novel method, biaxially oriented polyester film having a combination of desired properties which enable such film to find great utility in the shrink package making arts by providing improved seals and optics in shrink packages made using such film.

We claim:

1. A method of making a heat-sealable, heat-shrinkable biaxially oriented polyester film, such film being usable in making shrink packages having improved seals and improved optics, such method including the steps of:

forming a polymer consisting primarily of poly(ethylene terephthalate) with additional monomeric units selected from a second glycol and/or a second acid such polymer having a relative viscosity (at 1% concentration in 60/40 tetrachloroethane/-phenol at 30° C.) of at least 1.80 and a melting point of from about 215° C. to 230° C.;

casting a molten web of the polymer onto a cooled quenching surface to cool it below its glass transition temperature and thereby form a film;

stripping the film from the quenching surface;

heating the film to a temperature from about 60° to 80° C. by passage between and contact with slow nip rolls of a nip-roll stretcher;

further heating the film to a temperature from about 65° to 85° C. by radiant heat after emergence from the slow nip rolls, but before engagement with fast nip rolls of the nip-roll stretcher;

stretching the film in the machine direction by a stretch ratio from about 2.5 to 3.6 by maintaining the peripheral velocity of the fast nip rolls greater than the slow nip rolls by a factor equivalent to the stretch ratio, the stretching span being substantially less than the distance between the slow and fast nip rolls;

preheating the film from about 50° to 80° C. prior to entering a tenter frame for transverse stretching;

stretching the film in the tenter frame while heating such film at from about 50° to 85° C. so that the portion of the film subjected to stretching is stretched in the cross-machine direction by a factor of from about 2.9 to 4.0;

further heating the stretched film in the tenter frame to a temperature from about 65° to 100° C. while permitting the film to relax in width by a factor from about 0 to 5.0% its stretched width.

2. A method of making an improved heat-sealable, heat-shrinkable biaxially oriented polyester film, such film being usable in making shrink packages having improved seals and improved optics, such method including the steps of:

forming a polymer consisting primarily of poly-(ethylene terephthalate) with additional monomeric units selected from a second glycol and/or a second acid, such polymer having a relative viscosity (at 1% concentration in 60/40 tetrachloroethane/-phenol at 30° C) of at least 1.80 and a melting point of from about 215° to 230° C.;

casting a molten web of the polymer and quenching it to below its glass transition temperature thereby to form an amorphous film;

heating the amorphous film to a temperature from about 60° to 85° C. and stretching the thus heated film in the machine direction by a stretch ratio of from about 2.5 to 3.6;

stretching the film in a cross-machine direction while heating such film at a temperature from about 50° to 85° C. so that the portion of the film subjected to such stretching is stretched by a factor of from about 2.9 to 4.0; and further heating the thus stretched film to a temperature from about 65° to 100° C. while permitting the film to relax in width by a factor from about 0 to 5.0% its stretched width.

* * * * *